United States Patent Office 3,309,386
Patented Mar. 14, 1967

3,309,386
10-ALKYL STEROIDS AND PROCESSES FOR THEIR PREPARATION
Arthur Boller, Binningen, and Andor Fürst and Ernst Gerhard Herzog, Basel, Switzerland, assignors to Hoffmann-La Roche Inc., Nutley, N.J., a corporation of New Jersey
No Drawing. Filed Feb. 18, 1965, Ser. No. 433,774
Claims priority, application Switzerland, May 9, 1962, 5,541/62
7 Claims. (Cl. 260—397.3)

This application is a continuation-in-part of application Ser. No. 277,007, filed Apr. 30, 1963, now abandoned.

The present invention relates to novel steroids and to processes for their preparation. More particularly, the present invention relates to steroids having the formula

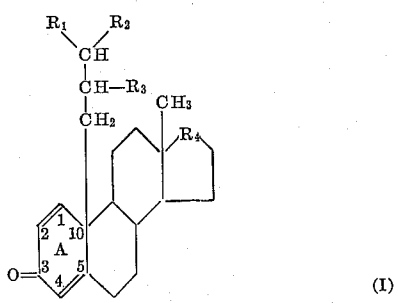

(I)

wherein $R_1$, $R_2$ and $R_3$ are hydrogen or lower alkyl, e.g., methyl, ethyl, propyl, isopropyl, butyl, etc., and $R_4$ is

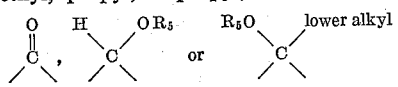

in which $R_5$ is hydrogen or lower alkanoyl, e.g., acetyl, propionyl, etc.; and to their 1,2-dihydro- and 1,2,4,5-tetrahydro-derviatives. Preferred compounds are those wherein $R_1$ through $R_3$ are hydrogen.

The term "lower" as used herein to refer to alkyl, alkenyl, and alkinyl, is to be understood to refer to groups having from 1 to 7 carbon atoms.

The process of the invention is carried out by hydrogenating a 10-alkenyl-3-keto-$\Delta^{1,4}$-steroid of the formula

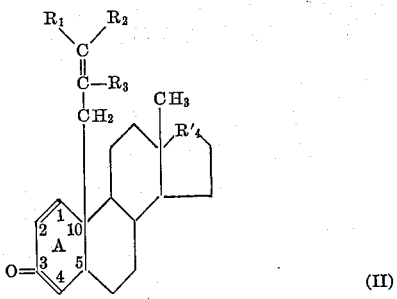

(II)

wherein $R_1$ through $R_3$ have the meanings given above and $R'_4$ is selected from the group consisting of

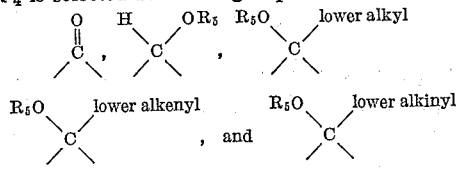

wherein $R_5$ has the above meaning.

The hydrogenation is carried out by reacting a steroid of Formula II with hydrogen in a nonpolar organic solvent, e.g., n-hexane, benzene, toluene, etc., and in the presence of a palladium catalyst, e.g., palladium-on-calcium carbonate or on barium carbonate. This hydrogenation reaction also results in the formation of the 1,2,4,5-tetrahydro-derivatives of the compounds of Formula I, i.e., in compounds having the formula

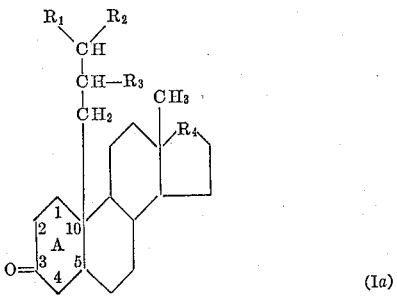

(Ia)

A compound of the formula

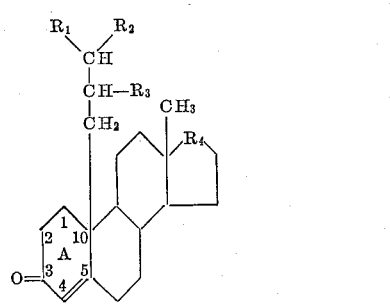

i.e., the 1,2-dihydro-derivative of the steroid of Formula I, can be prepared therefrom by reducing it with lithium in liquid ammonia.

The steroid of Formula II employed as starting material can be prepared by alkenylating the corresponding 3-hydroxy-steroid having an aromatic ring A by dearomatizing the A ring, for example, through the reaction of estrone with allyl bromide in an aqueous alkaline reaction medium.

Examples of starting steroids of Formula II include the following:

19-vinyl-androsta-1,4-dien-3,17-dione
19-vinyl-androsta-1,4-dien-3-on-17-ol
19-vinyl-17-methyl-androsta-1,4-dien-3-on-17-ol
19-vinyl-17-ethinyl-androsta-1,4-dien-3-on-17-ol
19-vinyl-17-ethenyl-androsta-1,4-dien-3-on-17-ol
19-vinyl-17-ethyl-androsta-1,4-dien-3-on-17-ol
19-vinyl-17-allyl-androsta-1,4-dien-3-on-17-ol The 10-alkyl steroids of Formula I, Ia, and Ib exhibit antigonadotropic activity; in particular, inhibition of prostatic growth. They are useful as gonadotropin-inhibiting agents.

*Example 1*

3 g. of 19-vinyl-androsta-1,4-dien-3,17-dione is dissolved in 10 ml. of absolute thiophene-free benzene and 40 ml. of n-hexane is added thereto. To this solution is added 1 g. of palladium-calcium carbonate catalyst and hydrogenation carried out at room temperature and normal pressure until about 1.1 moles of hydrogen are taken up. The catalyst is filtered off and the solvent removed under vacuum. 3 g. of a yellow oil is obtained, which crystallizes almost completely. 2 g. of these crystals are dissolved in high boiling petroleum ether and chromatographed on 60 g. of aluminium oxide (activity III). By elution with a mixture of petroleum ether (boiling point 40–45° C.) and benzene (8:1), 100 mg. of 19-ethyl-androstan-3,17-dione is obtained, which after recrystallization from ether-petroleum ether melts at 124–125° C.

By elution with benzene, there is obtained 1 g. of 19-ethyl-androsta-1,4-dien-3,17-dione, which after recrystallization from ether-petroleum ether melts at 180° C.

Example 2

Following the precess of Example 1, 19-vinyl-androsta-1,4-dien-3-on-17-ol is converted into 19-ethyl-androsta-1,4-dien-3-on-17-ol, melting point 149–150° C. (from ether-petroleum ether).

Example 3

Following the process of Example 1, 19-vinyl-17α-methyl-androsta-1,4-dien-3-on-17β-ol is converted into 19-ethyl-17α-methyl-androsta-1,4-dien-3 - on-17 - ol; melting point 135–136° C.

Example 4

100 mg. of finely divided lithium metal is added to 150 ml. of liquid ammonia under stirring. After a short time the expected dark blue color appears. After stirring for an additional 2 minutes there is added thereto all at once a solution of 620 mg. of 19-ethyl-androsta-1,4-dien-3,17-dione in 25 mg. of absolute tetra-hydrofuran and the mixture stirred for 2½ minutes. As soon as the addition begins, the blue color becomes lighter. However, the color remains during the entire reaction period. After 2½ minutes, 5 g. of pulverized ammonium chloride is added all at once, and the reaction mixture becomes completely decolorized. The ammonia is then removed and the residue taken up in water-ether. The aqueous portion is extracted three times with ether, the other extracts combined with the above ether layer, dried, and the ether removed by evaporation, leaving 605 mg. of a bright yellow oil. This oil is dissolved in benzene-petroleum ether (1:1) and added to a thirty-fold quantity of aluminium oxide of activity III. This same solvent mixture is then used to elute from the column 203 mg. of a colorless oil, which crystallizes upon standing. After one recrystallization from ether-petroleum ether, the product, 19-ethyl-Δ⁴-androstene-3,17-dione, is analytically pure; melting point 144–145° C.; yield 126 mg.

Example 5

According to the process of Example 4, 19-ethyl-Δ⁴-androsten-3-on-17-ol is obtained from 19-ethyl-androsta-1,4-dien-3-on-17-ol; melting point of the product 152° C. (from ether-petroleum ether).

Example 6

200 mg. of 19-ethyl-androsta-1,4-dien-3-on-17-ol (prepared as described in Example 2) is dissolved in 4 ml. of absolute pyridine and 1 ml. of propionic acid anhydride. The solution is allowed to stand at room temperature for 24 hours, then poured out into water and extracted with ether. The ethereal portion is washed with aqueous oxalic acid, sodium carbonate solution and water. After drying over anhydrous sodium sulfate, the solvent is removed and the oily residue (257 mg.) is chromatographed on silicagel. By elution with benzene-ether (5:1) there is obtained 217 mg. of light yellow oily 19-ethyl-androsta-1,4-dien-3-on-17-ol-17-propionate which crystallized on standing after four weeks. U.V.: $\epsilon_{247}=14{,}600$; I.R.: (fluid) 5.80μ, 8.53μ: ester; 6.05μ, 6.18μ, 6.25μ: ring A-dienone.

We claim:
1. A compound selected from the group consisting of (a) a compound of the formula

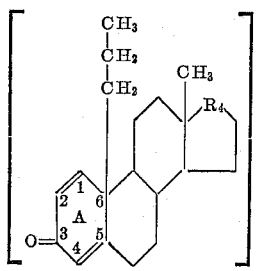

wherein $R_4$ is selected from the group consisting of

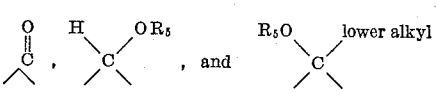

wherein $R_5$ is selected from the group consisting of hydrogen and lower alkanoyl.

2. A 1,2,4,5-tetrahydro-derivative of a compound of Formula I of claim 1.
3. 19-ethyl-androstan-3,17-dione.
4. 19-ethyl-androsta-1,4-dien-3,17-dione.
5. 19-ethyl-androsta-1,4-dien-3-on-17-ol.
6. 19-ethyl-17-methyl-androsta-1,4-dien-3-on-17-ol.
7. A process for the preparation of a steroid of the formula

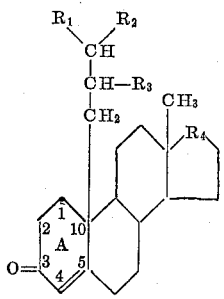

wherein $R_1$, $R_2$, and $R_3$ are selected from the group consisting of hydrogen and lower alkyl; $R_4$ is selected from the group consisting of

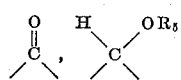

and

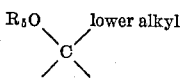

wherein $R_5$ is selected from the group consisting of hydrogen and lower alkanoyl, comprising the steps of
(a) hydrogenating a compound of the formula

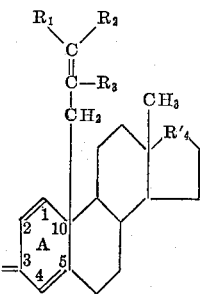

wherein $R_1$ through $R_3$ have the meanings given above and $R'_4$ is selected from the group consisting of

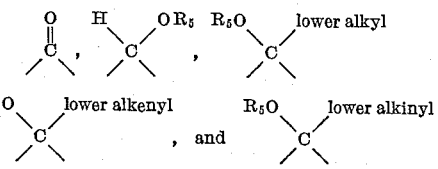

wherein $R_5$ has the above meaning, to form a compound having the formula

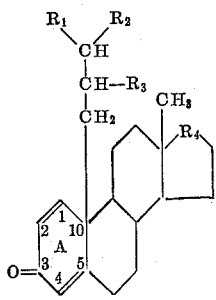

(I)

wherein $R_1$ through $R_4$ have the meaning given above, and (b) reacting the compound of Formula I with lithium and liquid ammonia.

References Cited by the Examiner
UNITED STATES PATENTS
3,207,767  9/1965  Bowers _____ 260—297.4

OTHER REFERENCES

Fieser et al.: "Steroids" (1960) Reinhold Publishing Co., N.Y., pages 329 and 519.

Lowenthal: "Tetrahedron," vol. 6, No. 4 (1959), pages 269–303, pages 269–274 relied on.

ELBERT L. ROBERTS, *Acting Primary Examiner.*

UNITED STATES PATENT OFFICE

CERTIFICATE OF CORRECTION

Patent No. 3,309,386                              March 14, 1967

Arthur Boller et al.

It is hereby certified that error appears in the above numbered patent requiring correction and that the said Letters Patent should read as corrected below.

Column 3, line 27, for "other" read -- ether --; column 3, lines 64 to 74, after the formula, insert -- (I) --.

Signed and sealed this 16th day of July 1968.

(SEAL)
Attest:

Edward M. Fletcher, Jr.                            EDWARD J. BRENNER
Attesting Officer                                         Commissioner of Patents